United States Patent [19]

Lengyel

[11] Patent Number: 5,754,262
[45] Date of Patent: May 19, 1998

[54] DAYLIGHT READABLE LIQUID CRYSTAL DISPLAY

[75] Inventor: J. Michael Lengyel, Ramona, Calif.

[73] Assignee: Litton Systems, Inc., Woodland Hills, Calif.

[21] Appl. No.: 901,683

[22] Filed: Jul. 28, 1997

Related U.S. Application Data

[63] Continuation of Ser. No. 421,371, Apr. 11, 1995, abandoned.

[51] Int. Cl.$^6$ .................................................. G02F 1/1335
[52] U.S. Cl. .................................................. 349/104; 349/137
[58] Field of Search .................................. 359/74, 66, 68; 349/104, 137, 105

[56] References Cited

U.S. PATENT DOCUMENTS

| | | | |
|---|---|---|---|
| 4,043,636 | 8/1977 | Eberhardt et al. | 350/160 |
| 4,315,258 | 2/1982 | McKnight et al. | 340/784 |
| 4,425,029 | 1/1984 | Funada et al. | 359/70 |
| 4,470,666 | 9/1984 | Eick | 350/339 |
| 4,500,173 | 2/1985 | Leibowitz et al. | 350/345 |
| 4,516,834 | 5/1985 | Cascini | 350/335 |
| 4,527,864 | 7/1985 | Dir | 350/337 |
| 4,545,648 | 10/1985 | Shulman et al. | 350/337 |
| 4,630,894 | 12/1986 | Cremers | 350/338 |
| 4,715,686 | 12/1987 | Iwashita et al. | 359/82 |
| 4,958,148 | 9/1990 | Olson | 340/712 |
| 4,989,956 | 2/1991 | Wu et al. | 350/345 |
| 4,991,941 | 2/1991 | Kalmanash | 350/347 |
| 5,018,837 | 5/1991 | McKee et al. | 350/345 |
| 5,027,111 | 6/1991 | Davis et al. | 340/784 |
| 5,121,030 | 6/1992 | Schott | 313/474 |
| 5,148,298 | 9/1992 | Shigeta et al. | 359/74 |
| 5,150,238 | 9/1992 | Vogeley et al. | 359/74 |
| 5,181,130 | 1/1993 | Hubby, Jr. | 359/42 |
| 5,252,955 | 10/1993 | Davis et al. | 345/87 |
| 5,293,262 | 3/1994 | Adachi et al. | 359/74 |
| 5,467,208 | 11/1995 | Kokawa et al. | 359/69 |
| 5,594,561 | 1/1997 | Blanchard | 349/137 |

FOREIGN PATENT DOCUMENTS

| | | | |
|---|---|---|---|
| 182639 | 5/1986 | European Pat. Off. | 359/66 |
| 3-116021 | 5/1991 | Japan | 359/66 |
| 6-138316 | 5/1994 | Japan | 359/66 |

*Primary Examiner*—William L. Sikes
*Assistant Examiner*—Tiep H. Nguyen
*Attorney, Agent, or Firm*—Price, Gess & Ubell

[57] ABSTRACT

A daylight readable LCD which may be used to communicate information as high contrast images (static or dynamic, color or monochrome) in bright ambient lighting conditions over a wide temperature range in direct sunlight. A contrast enhancement filter assembly is disposed at the interface between a backlit display and a user. The contrast enhancement filter assembly includes a triple bandpass contrast enhancement filter that preferably passes light efficiently in each of the red, green, and blue primary wavelengths and substantially absorbs all other wavelengths. Display contrast is increased because of the absorption of incident light having wavelengths that differ from the light produced by the internal backlight source within the display. This results in the display having a blacker background and enhanced purity of the color primaries. The display element is disposed generally behind the contrast enhancement filter assembly. An air gap separation is preferably provided between the contrast enhancement filter assembly and the display element to allow a heat conducting medium to flow therebetween to control thermal loading of the display. A fluorescent backlight assembly provides at least about 5,000 fL of illumination. An air gap separation is preferably provided between the display element and the backlight to allow a heat conducting medium to flow therebetween to control thermal loading of the display. The ratio of output light to reflected incident ambient light is at least about 5:1.

31 Claims, 4 Drawing Sheets

DAYLIGHT READABLE LIQUID CRYSTAL DISPLAY

This is a continuation of prior application Ser. No. 08/421,371, filed on Apr. 11, 1995, now abandoned.

BACKGROUND OF THE INVENTION

1. Field of the Invention

This invention relates to a display device for displaying images, and more particularly to a liquid crystal display device for generating and displaying images having sufficient contrast to be easily seen in bright daylight.

2. Description of Related Art

A persistent problem in the art of electronically generating and displaying images is generating an image with sufficient contrast between light and dark areas to permit the features of the image to be easily discerned in bright sunlight and over a wide temperature range. The principal reason that many display technologies, including liquid crystal displays (LCDs) and cathode ray tubes (CRTs), are difficult to read in bright ambient light conditions is that they reflect a significant amount of incident ambient light, which essentially masks any emissive or transmissive light from the display. For example, the phosphors on CRTs reflect about 70% to 80% of incident light. The phosphor luminance forming displayed information simply gets overcome by the reflected luminance, rendering the display illegible in direct sunlight. Similarly, active matrix LCD (AMLCD) panels reflect about 50% of incident light.

Sunlight is accepted in industry to be 10,000 foot candles of incident illumination with a spectral energy distribution profile that favors the blue wavelengths of light. It is also accepted in industry that contrast values of 5:1 or higher are necessary in high ambient lighting conditions if the display is to be daylight readable. This means an emissive display with high background reflectance, such as a CRT, would need to emit on the order of 35,000 fL–40,000 fL to be legible in direct sunlight. Considering that CRT displays that produce 200 fL–300 fL of luminance at their face are considered exceptional, achieving such a high level of luminance in an emissive panel is extremely difficult.

In addition to such problems with emissive displays, it would be desirable for a number of reasons, such as power consumption and display size, to be able to use LCDs (sometimes referred to as light valve displays) as outdoor displays. Possible uses would be bank ATM machines and information kiosks. However, to date, such displays have not been daylight readable.

A typical LCD assembly consists of a liquid crystal cell and two linear polarizers. A first linear polarizer is disposed on the front surface of the liquid crystal cell. A second linear polarizer is disposed on the back of the liquid crystal cell. The polarizer can be envisioned as a fine parallel line grating having parallel lines spaced equidistant apart. For the linear polarizer to provide the effect needed for an LCD, the width of the lines and spaces of the polarizer must be approximately the size of the wavelength of light the polarizer is intended to selectively pass. The E-vector of light provided by a typical light source used with an LCD is generally completely random in orientation. However, only incident light waves having E-vectors aligned with the grating of the polarizer pass through virtually unaltered. The dark body of the polarizer in a liquid crystal display absorbs light that does not have aligned E-vectors, whether that light is incident on the front of the LCD or sourced from the rear. A good quality linear polarizer will pass 40% to 45% of randomly aligned incident light (50% is the theoretical limit for linear polarizers).

The light valve resident between the polarizers is the liquid crystal cell. Liquid crystal materials are typically long chain-like molecules that have the unique property of being able to rotate from a first axis to a second axis of orientation when a voltage is applied across the cell gap. The degree of rotation is principally controlled by the magnitude of the voltage across the cell. The cell, in reference to the polarizers, can be thought of as a shutter. When the cell is turned on, it allows light from the rear illumination source (backlight) to pass completely through the assembly. When the cell is turned off, the display is dark. For color LCD displays, color filters are placed over discrete cell locations in a pixel pattern or mosaic (one each red, green, and blue sub-pixel making a white color dot) and the emission spectra in the backlight is matched to the color filters to make a color display.

LCD transmissive displays have inherently higher contrast in high ambient lighting environments than emissive displays because of the dark, nearly black, background color of the linear polarizer. The dark body of the polarizer in a liquid crystal display absorbs most light, whether incident on the front or sourced from the rear, that does not have a specific E-vector. However, some background reflectance of ambient light still occurs, particularly with AMLCDs. To meet the 5:1 contrast discussed earlier and overcome the effects of the background reflectance on the front surface due to sunlight, the LCD assembly would need to provide about 1,000 fL of luminance at its front face. While this is a lot less than emissive displays, it is still a very bright display (i.e., backlight) and beyond practical limitations imposed on such systems, such as the amount of heat which may be generated in a very high power system. For reference, typical notebook computer displays produce 20 fL–40 fL at the face of the display. State of the art military LCD displays generate as much as 200 fL at the display face.

Another problem with using conventional LCD panels in direct sunlight is due to heat. Typically, the majority of light incident on an LCD panel is absorbed. Light energy absorbed in the polarizer is translated into heat. Light absorption is a desirable optical characteristic, but such absorption increases the temperature of the liquid crystal cell, and thus limits the useful ambient temperature range of the display. Liquid crystal displays can only perform optimally over a narrow band of temperatures (typically about 0° C. to 40° C.). At temperatures below 0° C., the liquid crystal material loses its mobility and cannot readily react to a voltage applied across the cell gap. At temperatures above 40° C., referred to as the "clearing temperature", a condition known as "clearing" occurs in which all cells move to an open state. Accordingly, information content is lost because there is no discernable contrast in the display.

The clearing temperature of a liquid crystal cell can be reached in at least two ways. First, the ambient air temperature can directly raise the temperature of the liquid crystal material. Second, the temperature of the liquid crystal material can be elevated by external thermal loading, such as from direct sunlight, even if the ambient temperature is below the clearing temperature for the material. External thermal loading from direct sunlight is more particularly known as solar loading. Accordingly, because an LCD can clear due to solar loading even when the ambient air temperature is well below the clearing temperature, solar loading imposes limitations on where and how LCDs can be used.

Therefore, there is currently a need for an LCD which is easily readable in daylight and which is usable over a wide temperature range in direct sunlight.

SUMMARY OF THE INVENTION

The present invention is a daylight readable color LCD which may be used to communicate information as high contrast images (static or dynamic, color or monochrome) in bright ambient lighting conditions over a wide temperature range in direct sunlight.

The present invention preferably has three major components. The first major component is a contrast enhancement filter assembly that is disposed at the interface between the display and the user. The contrast enhancement filter assembly includes a triple bandpass contrast enhancement filter that preferably passes light at three selected wavelengths, and absorbs essentially all other visible light. The contrast enhancement filter assembly preferably passes light efficiently in each of the red, green, and blue primary wavelengths necessary to make white light in an additive color system. Display contrast is increased by use of the contrast enhancement filter because of the absorption of incident light having wavelengths that differ from the light produced by the internal backlight source within the display. This results in the display having a blacker background and enhanced purity of the color primaries. In the preferred embodiment, an anti-reflection coating is provided on the two dominant surfaces of the contrast enhancement filter.

The second major component of the preferred embodiment of the present invention is the display element. The display element is disposed generally behind the contrast enhancement filter assembly. An air gap separation is preferably provided between the contrast enhancement filter assembly and the display element to allow a heat conducting medium to flow therebetween. In the present context, the term "heat conducting medium" is used to generically to refer to a gas, liquid or other heat conductor that is capable of either cooling or heating the display element to maintain the liquid crystal material in the liquid crystal cell within an optimum operating temperature range.

The display element is preferably a passive matrix LCD (PMLCD), although the invention may be used with a properly treated active matrix LCD (AMLCD). In the preferred embodiment, the exposed surface of the front polarizer is provided with an anti-reflection coating.

The third major component of the preferred embodiment of the present invention is a backlight assembly. The backlight assembly is any source of randomly oriented light and preferably is capable of generating at least 5,000 fL. In one embodiment, the backlight assembly is a fluorescent dimmable backlight.

A physical separation is preferably provided between the backlight and the display element. The physical separation preferably permits a heat conducting medium to remove heat from the back surface of the display element. This reduces the affects of thermal loading from the backlight assembly. In an alternative embodiment of the present invention, the heat conducting medium may be a solid which fills the separation. The solid acts as a heat source or heat sink to provide temperature stabilization to the liquid crystal material.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

The present invention is a daylight readable LCD display which may be used to communicate information as images in bright ambient lighting conditions and over a wide temperature range.

There are at least two ways in which the contrast of a transmissive LCD display can be enhanced. Firstly, a significantly greater luminance can be provided in the backlight to make a brighter display. Secondly, the amount of reflected ambient light can be reduced. The present invention optimizes the use of both techniques.

Figure 1:
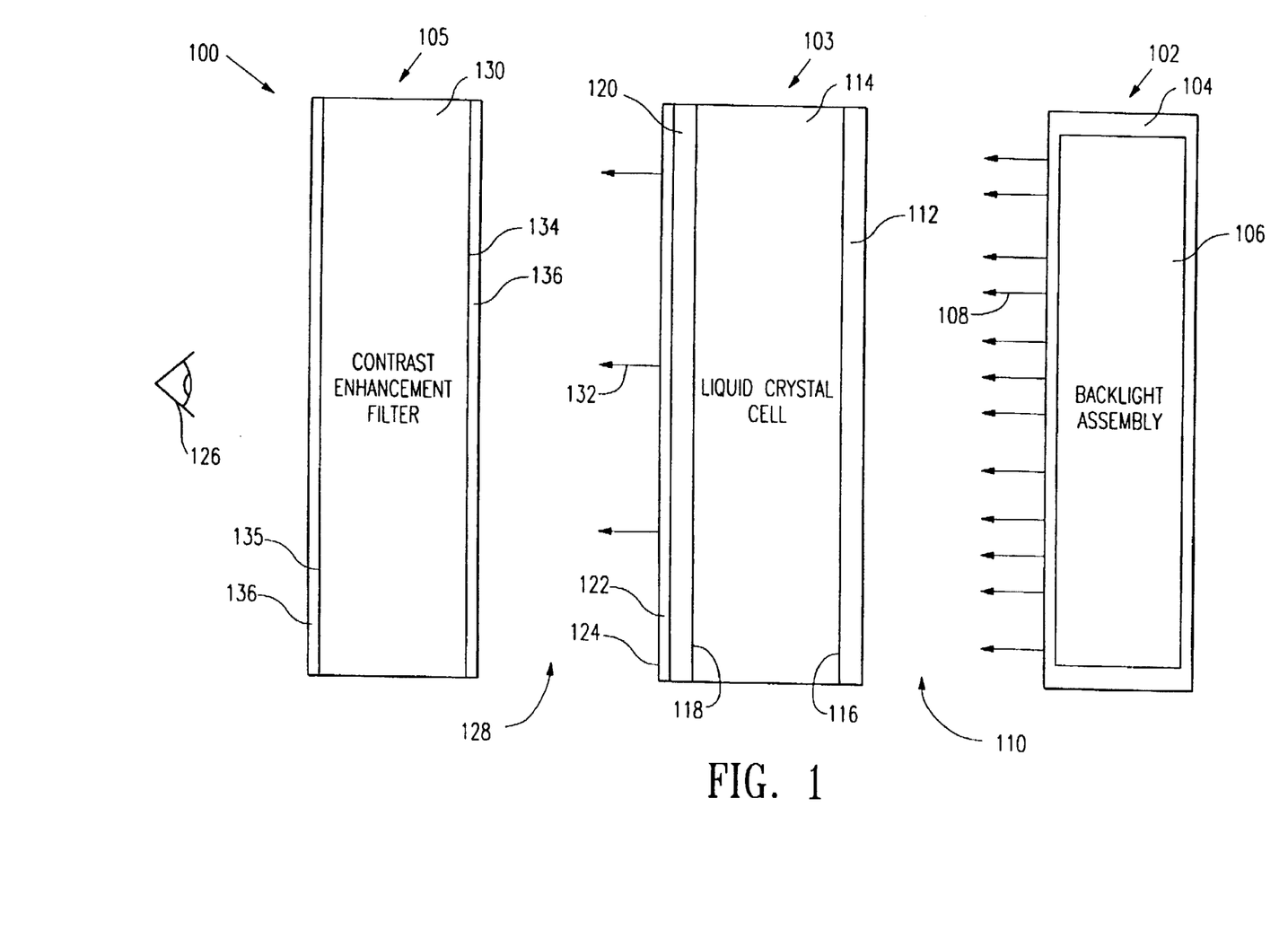
FIG. 1 is a block diagram of one embodiment of the present invention showing the three major components comprising the inventive display.

FIG. 1 is an illustration of one embodiment of the present invention in which three major components comprise the inventive display 100. The first of the three major components is a backlight assembly 102 including a light source. The second major component is a display element 103, preferably a passive matrix LCD panel. The third major component is a contrast enhancement assembly 105.

The backlight assembly 102 preferably is a very high intensity light source, preferably having at least 5,000 fL of luminance. In the preferred embodiment, the backlight assembly 102 is the backlight described in U.S. patent application Ser. No. 08/150,355, assigned to the assignee of the present invention. However, any conventional light source having sufficient brightness and similar emissive spectra may be used, such as a conventional fluorescent light fixture, a conventional incandescent light fixture, a halogen light fixture, or any other light source.

The preferred backlight assembly 102 comprises a fluorescent cavity 104 coated with phosphors that are activated by a phosphor illuminator 106. In accordance with the preferred embodiment of the present invention, the phosphor illuminator 106 comprises an ultraviolet (UV) gas discharge lamp (not shown) having no coating of phosphor, internally or externally, in or on the tube. The light tube is preferably fabricated to provide the highest UV flux density per unit volume of the internal plasma.

The phosphors within the fluorescent cavity 106 used in the preferred backlight assembly 102 of a color display 100 are selected so the peak emission spectra of each is predominantly at approximately 600–660 nm (red), 500–560 nm (green), or 400–460 nm (blue). The red, green, and blue phosphors are blended to produce an aggregate white output, the spectral characteristics of which can be "tuned" by varying the proportions of the blend.

The phosphors are the primary source of light in the backlight. However, in the preferred embodiment, mercury is used in the lamp as the source of UV in the gas discharge lamp, as disclosed in the above referenced patent application. A benefit of mercury is two strong emissions at 546 nm green and 436 nm blue. The 546 emission line of the mercury is relatively close to the 545 emission line of the green phosphor. Therefore, the 546 emission line provides the appearance of a slightly broader emission band in the green light region. The 436 emission line of mercury gives the appearance of a phosphor peak. Therefore, the 436 emission line of the mercury provides greater amplitude to the phosphor emission from the 447 nm blue phosphors. Accordingly, both mercury emission lines are used similarly to the phosphor and add to the luminance of the display.

In a passive matrix LCD, transmittance through the LC material, polarizers, color filters, and deposited metal for row and column traces is typically about 2.5% to 5%. Due to the absorption and reflections of light by the display element 103, a passive matrix LCD panel equipped with the preferred high intensity backlight can provide about 200–300 fL at its front surface. A typical PMLCD will reflect about 4% to 8% of the light incident on the polarizer. Therefore, this value is still much less than the 1,000 fL required for a daylight readable display which is not in accordance with the present invention. Since it is not at present practical to manufacture significantly more luminance in the backlight to make a brighter display, the only way to achieve greater contrast is to reduce the reflections of ambient or background light.

Light (illustrated by arrows 108 in FIG. 1) that is emitted from the backlight assembly 102 passes through a first physical separation or air gap 110 and strikes the back surface of the display element 103. The separation 110 minimizes direct conduction of heat from the backlight assembly 102 to the display element 103. The separation 110 also allows a heat conducting medium, such as air, to flow between the backlight assembly 102 and the display element 103. In the present context and throughout this description, the term "heat conducting medium" is used to generically to refer to a gas, liquid, or solid heat conductor capable of conducting heat either from or to the display element. Accordingly, the heat conducting medium is capable of either cooling or heating the display element 103 to maintain the liquid crystal material in the liquid crystal cell within an optimum operating temperature range. For example, in an alternative embodiment, a solid heat conductor may be coupled to a heat sink or source to maintain the temperature of the display element 103 within a desired temperature range. In the preferred embodiment, the heat conducting medium is air which flows through the separation due to convection currents. The air flowing over the surface of the display element 102 reduces the affects of thermal loading on the liquid crystal display 103 from the backlight assembly 102. In the preferred embodiment, the separation 110 is about 1 mm to about 5 mm.

In the preferred embodiment, the display element 103 has linear polarizers 112, 120 affixed to the back surface 116 and front surface 118, respectively, of a liquid crystal cell 114. The liquid crystal cell 114 is preferably activated by a conventional LCD drive circuit (not shown). The orientation of the first and second polarizers 112, 120 and the configuration of the first and second polarizer 116, 120 and the liquid crystal cell 114 are conventional. In the preferred embodiment of the present invention, the second polarizer 120 has an anti-reflection coating 122 applied to the exposed front surface 124. The anti-reflection coating 122 is conventional and helps to prevent light that originates from sources outside the display 100 from reflecting back to a viewer 126. For example, the anti-reflection coating 122 may be vacuum deposited magnesium fluoride, zirconium oxide, or other metallic oxide.

In the preferred embodiment, when a passive matrix LCD is used as the display element 103, all of the reflective surfaces (such as the metal that make up the row and column traces) are treated in known fashion to minimize reflections.

Light (illustrated by arrows 132 in FIG. 1) that is transmitted through the display element 103 passes through a second physical separation or air gap 128 and strikes the rear surface 134 of the contrast enhancement assembly 105. The separation 128 prevents direct conduction of heat from the contrast enhancement assembly 105 to the display element 103 and vice-versa. The separation 128 also allows a heat conducting medium, such as air, to flow between the contrast enhancement assembly 105 and the display element 103. In the preferred embodiment, the separation 128 is about 1 mm to about 5 mm.

Figure 2A:
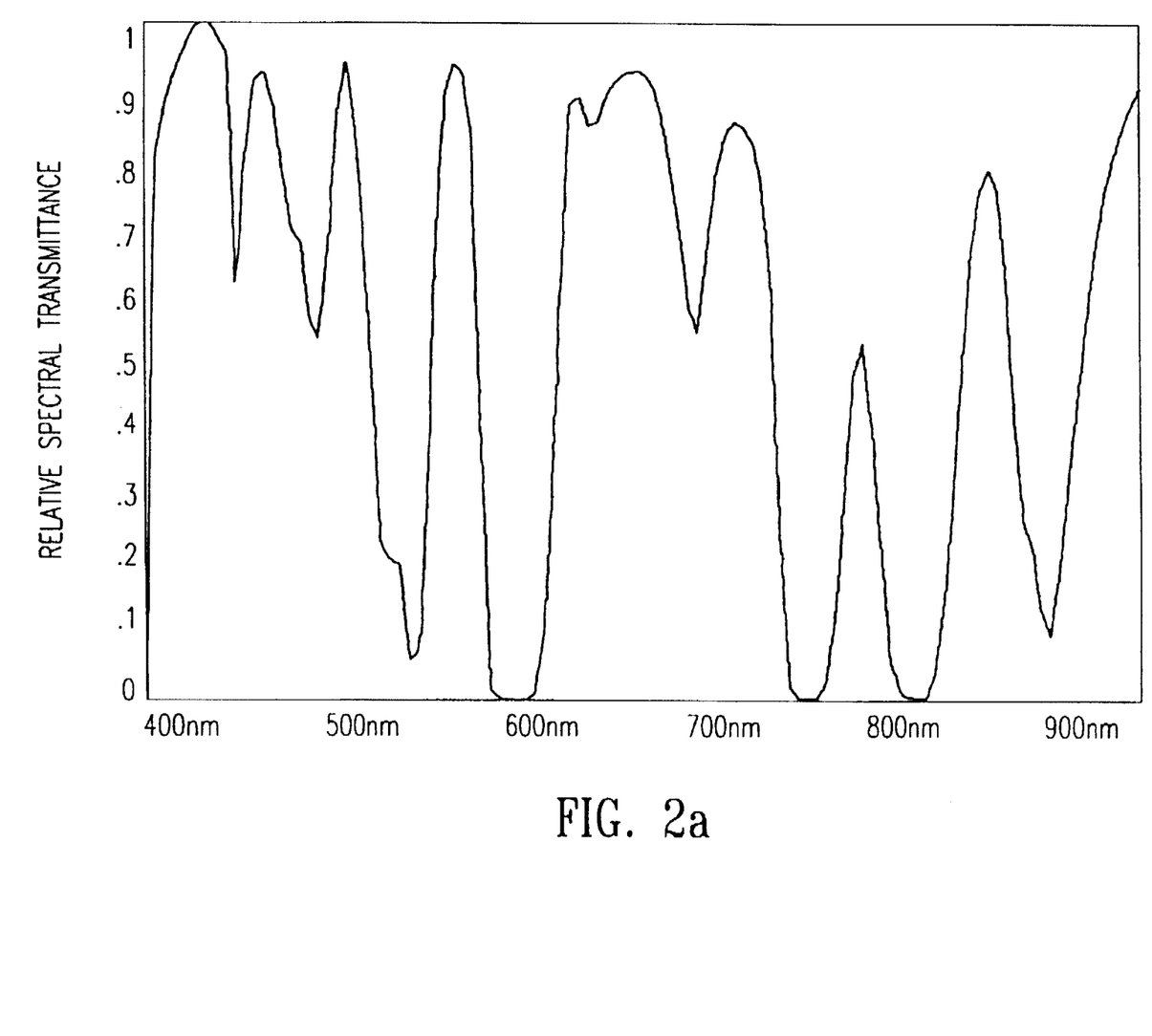
FIG. 2a is a graph of the relative spectral transmittance of the contrast enhancement filter used in the preferred embodiment.
Figure 2B:
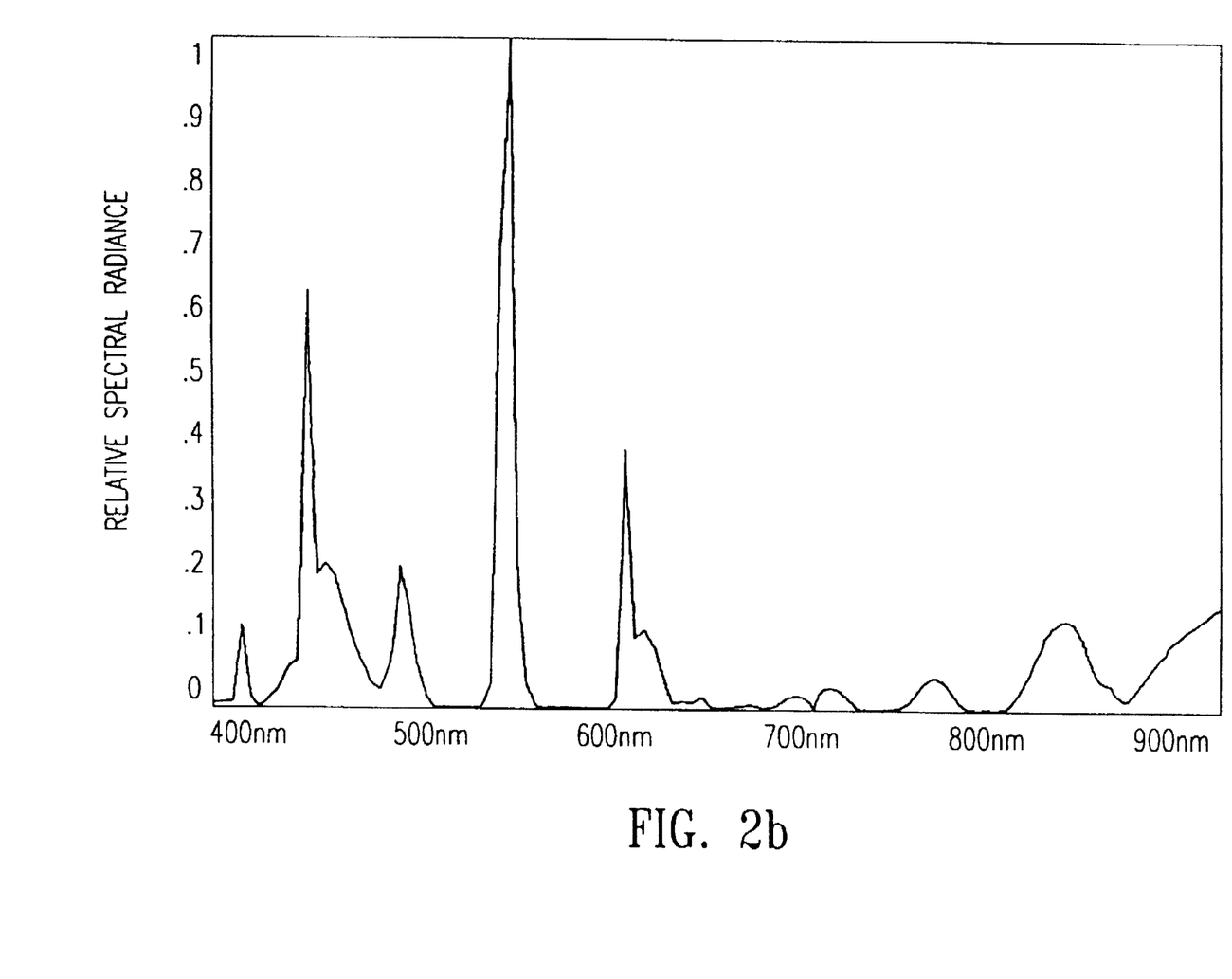
FIG. 2b is a graph of the relative spectral radiance of a display using the contrast enhancement filter of the preferred embodiment.

In accordance with the preferred embodiment of the present invention, the contrast enhancement assembly 105 comprises a contrast enhancement filter 130 with each of the dominant surfaces 134, 135 having a conventional anti-reflection coating 136 applied thereto. The contrast enhancement filter 130 is preferably an absorptive "triple-pass" homogenous composition filter (such as glass type S-8807, distributed by Schott Corporation of Duryea, Pa.) which passes light primarily in each of the three primary color (RGB) regions and absorbs most other light. FIG. 2a is a graph of the relative spectral transmittance of the filter used in the preferred embodiment. FIG. 2b is a graph of the relative spectral radiance of a display equipped with such a contrast filter. The contrast enhancement filter 130 absorbs a portion of ultraviolet, visible, and near infra-red light energy that strikes the filter 130. Absorption by the contrast enhancement filter 130 of the portion of the total solar spectrum reduces solar loading (heat loading) of the liquid crystal cell 114. Because the filter 130 is not physically attached to the display element 103, direct coupling of the heat to the liquid crystal cell 114 is inhibited.

Also, as the name implies, the contrast enhancement filter 130 enhances the contrast of the image generated by the display element 103. This enhancement is due to the additional absorption, especially at wavelengths that are not produced by the backlight assembly 102 (i.e., light at wavelengths other than the wavelengths of light intentionally produced by the phosphors within the fluorescent cavity 104). In the preferred embodiment, the contrast enhancement filter 130 absorbs at least about 70% of incident light having wavelengths centered around about 540 nm and about 580 nm (i.e., between blue and green, and green and red, respectively). Conversely, in the preferred embodiment, the contrast enhancement filter 130 passes at least about 70% of incident light having wavelengths centered around about 447 nm (blue), 545 nm (green), and 626 nm (red).

It should be noted that incident sunlight must pass through the contrast enhancement filter 130 in two directions (i.e., first entering and then exiting) before becoming background light which might obscure the intended display image if the incident light was not absorbed by the contrast enhancement filter 130 or otherwise blocked. Thus, sunlight at wavelengths outside the primary pass bands of the contrast enhancement filter 130 is reduced by an additional 3 dB.

For example, sunlight that strikes the front surface of the display 100 first encounters the front surface anti-reflection coating 136. As is known, such anti-reflection coatings reduce surface specular (mirror-like) reflections. Accordingly, no more than about 2%, and preferably only about 0.3%, of incident (first surface) light is reflected. The light which is neither absorbed nor reflected by the anti-reflection coating 136 passes through contrast enhancement filter 130 for a first time. The contrast enhancement filter 130 absorbs a substantial portion (at least about 30%) of the total incident light responsible for thermal loading (i.e., wavelengths in the range of 100–1200 nm). In the preferred embodiment, the contrast enhancement filter 130 absorbs about 100% of UV radiation (100–380 nm), at least about 20% of the total visible spectrum (380–780 nm), and at least about 20% of near-infrared radiation (780–1200 nm).

The light that is not absorbed by the contrast enhancement filter 130 passes through the rear surface anti-reflection coating 136, which reduces light reflections from the rear surface, and between the contrast enhancement filter and the display element 103.

Thereafter, the remaining ambient light that has passed through the contrast enhancement assembly 105 enters the display element 103, where much of such light is absorbed by the front polarizer 118. A portion (about 2%) of this light is reflected by the metal traces and other features of the liquid crystal cell 114. A relatively small amount of light is also reflected by other elements of the display element 103, such as filter dyes and laminate materials used in construction of the LCD. All of the reflected light must then pass through the contrast enhancement assembly 105 once again. Therefore, any portion of the light that is at wavelengths other than the color primaries will again be substantially absorbed. In fact, even those components of the reflected light that are in the primary regions will be attenuated (however, to a much lesser degree than non-primary region light), since the contrast enhancement filter 130 is not perfectly transparent, even in the primary regions.

Figure 3:
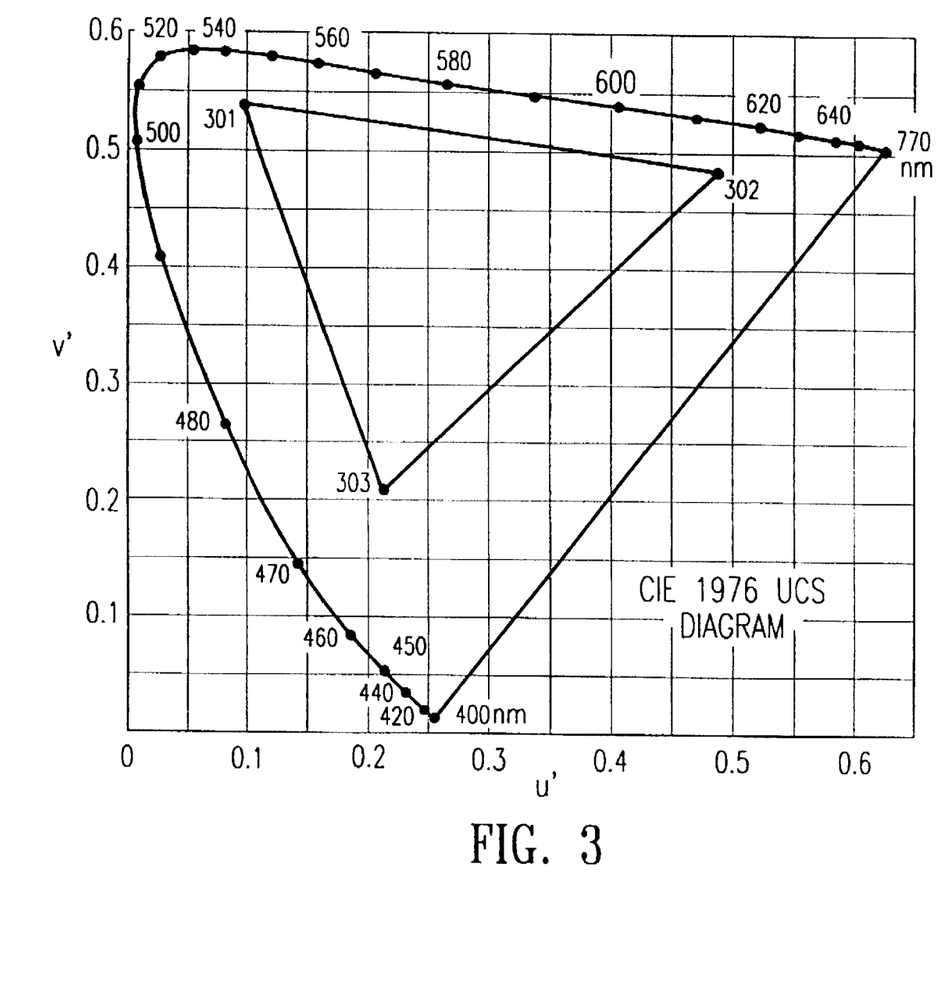
FIG. 3 is a 1976 CIE u', v' chromaticity diagram.

Use of a triple-pass filter also enhances the color purity of the display, because the filter absorbs strongly between the primary emitters. Accordingly, any secondary and tertiary emissions resident in the backlight are "filtered" from the observer 126. This results in an enhancement in the purity of the color primary that is visibly significant (there are fewer satellite emissions in close proximity to the principal emitter that would otherwise desaturate the desired color). When the color primaries are more saturated, the total potential color palette increases, as illustrated on the 1976 CIE u', v' chromaticity diagram (FIG. 3). The total number of potential colors is defined as all the colors contained within the boundaries of the triangle constructed from straight lines drawn between the green/red 301, red/blue 302, and blue/green 303 chromaticity points.

Because of the light energy absorbed by the contrast enhancement filter 130, the contrast enhancement assembly 105 is heated. As noted above, the separation 128 provided between the display element 103 and the contrast enhancement filter assembly 105 helps reduce the affects of thermal loading on the liquid crystal display 103 from the contrast enhancement filter assembly 105.

The structure illustrated in FIG. 1 and described above provides two substantial advantages over the prior art. First, the spacings or separations 128, 110 between the major components 102, 103, 105 of the display 100 allow a heat conducting medium to conduct heat to or from each component 102, 103, 105 and thus reduce any affects of thermal loading that would otherwise cause the temperature of the liquid crystal material within the liquid crystal cell 114 to rise in temperature, and thus reduce the effective temperature range of the display 100. Second, the use of a triple-pass contrast enhancement filter 130 at the interface between the user and the display provides a very substantial decrease in background light. Furthermore, the use of anti-reflection coatings on each disjunctive surface reduces the amount of reflectance, and thus the background light.

Accordingly, the present invention provides a substantial increase in the contrast of the image generated. That is, the contrast ratio of transmitted light to reflected light is at least about 5:1 in room light exceeding about 5,000 foot candles of incident illumination. In experiments using the preferred embodiments described above, the contrast ratio exceeds about 20:1 under similar conditions.

A color PMLCD working model of the invention has been built in accordance with the above described preferred embodiment. The prototype has an operating temperature in the range of about 0° C. to about 40° C. The prototype display has a image area with a diagonal dimension of approximately 9.4 inches, and consumes approximately 75 W. (Of course, alternative embodiments may be larger or smaller, and use more or less power). In bright sunlight of about 10,000 foot candles of incident illumination, the prototype display absorbs at least about 50% of the incident external light, reflects less than about 0.3% of the incident light, and has a ratio of transmitted light to reflected incident light of about 10:1, well in excess of the 5:1 ratio generally deemed to be required for daylight readability.

A number of embodiments of the present invention have been described. Nevertheless, it will be understood that various modifications may be made without departing from the spirit and scope of the invention. For example, the present invention may use a monochromatic contrast enhancement filter 130 with a monochrome LCD panel when the display is to generate monochromatic images. Furthermore, while the present application focuses on the use of a passive matrix LCD, the invention may be used with an active matrix LCD. Also, any orientation of the polarizers with respect to the liquid crystal display may be used in accordance with the present invention. Still further, a wide variety of gases, liquids, or solids may be used as the heat conducting medium in the separations between the components of the inventive display. Accordingly, it is to be understood that the invention is not to be limited by the specific illustrated embodiment, but only by the scope of the appended claims.

I claim:

1. A display that is daylight readable in ambient light, external to the display exceeding about 5,000 foot candles of incident illumination, including:

(a) a backlight source for providing initial transmitted light;

(b) a display element adjacent the backlight source for modulating the initial transmitted light to display images; and (c) a front filter adjacent the display element and having the characteristics of:

(1) absorbing at least about 30% of incident ambient light;

(2) reflecting less than about 2% of incident ambient light;

(3) transmitting the modulated initial transmitted light as output light;

wherein the combination of backlight source, display element, and filter provide a ratio of output light to reflected incident ambient light of at least about 5:1.

2. The daylight readable display of claim 1, wherein the backlight source generates at least about 5,000 fL.

3. The daylight readable display of claim 1, wherein the display element includes:

(a) a first polarizer for polarizing light;

(b) a liquid crystal cell adjacent the first polarizer for selectively altering the orientation of the E-field of incident light polarized by the first polarizer; and (c) a second polarizer adjacent the liquid crystal cell for polarizing light altered by the liquid crystal cell.

4. The daylight readable display of claim 3, wherein at least one exposed surface of the display element has an anti-reflection coating.

5. The daylight readable display of claim 3, wherein at least two exposed surfaces of the display element have an anti-reflection coating.

6. The daylight readable display of claim 4 or 5, wherein at least one of the polarizers is a linear polarizer.

7. The daylight readable display of claim 1, wherein at least one surface of the filter has an anti-reflection coating.

8. The daylight readable display of claim 1, wherein the filter absorbs about 30% of the incident ambient light responsible for thermal loading.

9. The daylight readable display of claim 1, wherein the filter is a triple-pass filter.

10. The daylight readable display of claim 9, wherein the filter passes about 70% of incident light at generally blue, green, and red wavelengths.

11. The daylight readable display of claim 9, wherein the filter absorbs at least about 70% of incident light having wavelengths generally between blue and green light and between green and red light.

12. The daylight readable display of claim 1, wherein the front filter has the characteristic of absorbing at least about 50% of incident ambient light.

13. The daylight readable display of claim 1, wherein the front filter has the characteristic of reflecting less than about 0.3% of incident ambient light.

14. The daylight readable display of claim 1, wherein the ratio of output light to reflected incident ambient light is at least about 10:1.

15. The daylight readable display of claim 14, wherein the ratio of output light to reflected incident ambient light is at least about 20:1.

16. A daylight readable display for use in bright ambient light comprising:
(a) a back light source for providing initial transmitted light,
(b) a display element adjacent the backlight source for modulating the initial transmitted light to display images;
(c) a selective-pass front filter in front of the display element having a characteristic of transmitting the modulated initial transmitted light from the display element and selectively filtering incident ambient light; and
(d) a thermal conduction medium disposed between said front filter and the display element to reduce heating of the display element by the incident ambient light
wherein the combination of backlight source, display element, and filter provide a ratio of output light to reflected incident ambient light of at least about 5:1.

17. The display of claim 16, wherein the backlight source generates at least about 5,000 fL.

18. The display of claim 16, wherein the selective-pass filter absorbs 20% or more of incident ambient light responsible for thermal solar loading.

19. The display of claim 16, wherein said selective-pass front filter is a triple-pass filter.

20. The display of claim 16, wherein said selective-pass front filter passes about 70% of incident light at generally blue, green, and red wavelengths.

21. The display of claim 16, wherein said selective-pass front filter absorbs at least about 70% of the incident light having wavelengths generally between blue and green light and between green and red light.

22. The display of claim 16, wherein said selective-pass front filter reflects less than about 2% of incident ambient light.

23. A daylight readable display for use in bright ambient light comprising:
(a) a backlight source for providing initial transmitted light;
(b) a display element adjacent the backlight source for modulating the initial transmitted light to display images;
(c) a selective-pass front filter in front of the display element, having characteristics of:
(1) absorbing heat energy in a solar radiant spectrum of incident ambient light;
(2) transmitting the modulated initial transmitted light from the display element;
(3) selectively filtering the incident ambient light; and
(d) a thermal conduction medium disposed between said display element and said front filter to reduce heating of the display element by the absorbed heat energy;
wherein the combination of backlight source, display element, and filter provide a ratio of output light to reflected incident ambient light of at least about 5:1.

24. The daylight readable display of claim 16 or 23, wherein the thermal conduction medium is air.

25. The daylight readable display of claim 24, wherein the backlight source is spaced a minimum of about 1 mm from the display element.

26. The daylight readable display of claim 24, wherein the display element is spaced a minimum of about 1 mm from the filter.

27. A display that is daylight readable in ambient light, external to the display, exceeding about 5,000 foot-candles of incident illumination, including:
(a) a backlight source for providing initial transmitted light;
(b) a display element adjacent the backlight source for modulating the initial transmitted light to display images; and
(c) a front filter adjacent the display element and having the characteristics of:
(1) absorbing at least about 50% of incident ambient light;
(2) reflecting less than about 0.3% of incident ambient light;
(3) transmitting the modulated initial transmitted light as output light;
wherein the combination of backlight source, display element, and filter provide a ratio of output light to reflected incident ambient light of at least about 5:1.

28. A display that is daylight readable in ambient light external to the display exceeding about 5,000 foot-candles of incident illumination, including:
(a) a fluorescent backlight source for providing initial transmitted light of at least about 5,000 fL;
(b) a display element adjacent the backlight source for modulating the initial transmitted light to display images, the display element including:
(1) a first polarizer for polarizing light;
(2) a liquid crystal cell adjacent the first polarizer for selectively altering the orientation of the E-field of incident light polarized by the first polarizer; and (3) a second polarizer adjacent the liquid crystal cell for polarizing light altered by the liquid crystal cell;

(c) a homogenous composition triple-pass front filter adjacent the display element and having the characteristics of:

(1) absorbing at least about 50% of incident ambient light;

(2) reflecting less than about 0.3% of incident ambient light;

(3) transmitting the modulated initial transmitted light as output light;

wherein the combination of backlight source, display element, and filter provide a ratio of output light to reflected incident ambient light of at least about 5:1.

29. A method of displaying daylight readable images in ambient light, external to the display exceeding about 5,000 foot candles of incident illumination, including the steps of:

(a) providing a backlight source for generating initial transmitted light;

(b) providing a display element adjacent the backlight source for modulating the initial transmitted light to display images; and (c) providing a front filter adjacent the display element and having the characteristics of:

(1) absorbing at least about 30% of incident ambient light;

(2) reflecting less than about 2% of incident ambient light;

(3) transmitting the modulated initial transmitted light as output light;

wherein the combination of backlight source, display element, and filter provide a ratio of output light to reflected incident ambient light of at least about 5:1.

30. The method of claim 29, wherein the display element is a passive matrix liquid crystal display.

31. The display of claims 1, 16, 23, 27, or 28, wherein the display element is a liquid crystal display.

* * * * *